US009055635B2

(12) United States Patent
Yu et al.

(10) Patent No.: US 9,055,635 B2
(45) Date of Patent: Jun. 9, 2015

(54) CONTROLLED-SILICON ADAPTING LED DRIVING CIRCUIT, METHOD AND SWITCH MODE POWER SUPPLY

(71) Applicant: Silergy Semiconductor Technology (Hangzhou) LTD, Hangzhou, ZheJiang Province (CN)

(72) Inventors: Feng Yu, Hangzhou (CN); Xiaodong Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 203 days.

(21) Appl. No.: 13/938,644

(22) Filed: Jul. 10, 2013

(65) Prior Publication Data

US 2014/0062322 A1    Mar. 6, 2014

(30) Foreign Application Priority Data

Aug. 28, 2012 (CN) .......................... 2012 1 0310056

(51) Int. Cl.
H05B 33/08 (2006.01)
(52) U.S. Cl.
CPC ........ H05B 33/0815 (2013.01); H05B 33/0851 (2013.01); Y02B 20/346 (2013.01); Y02B 20/348 (2013.01)

(58) Field of Classification Search
USPC .............................. 315/291, 335, 206, 200 R; 363/12–21.17
See application file for complete search history.

(56) References Cited

U.S. PATENT DOCUMENTS

| | | | |
|---|---|---|---|
| 6,567,281 B2 * | 5/2003 | Riggio et al. .................. 363/24 |
| 2010/0207536 A1 * | 8/2010 | Burdalski et al. ............ 315/224 |
| 2011/0175532 A1 * | 7/2011 | Peng ............................. 315/119 |
| 2012/0242237 A1 | 9/2012 | Chen |

* cited by examiner

*Primary Examiner* — Dinh Le
(74) *Attorney, Agent, or Firm* — Michael C. Stephens, Jr.

(57) ABSTRACT

Disclosed are light-emitting diode (LED) driver circuits, methods, and a switch mode power supply. In one embodiment, an LED driver can include: (i) a silicon-controlled rectifier (SCR) and a rectifier bridge configured to receive an AC voltage, and to generate a phase-loss half sine wave voltage signal; (ii) a threshold voltage control circuit configured to receive a threshold voltage and an input voltage signal that represents the phase-loss half sine wave voltage signal, and to determine whether to output the threshold voltage based on angle information of the input voltage signal; (iii) a first control circuit configured to compare the input voltage signal against the threshold voltage output by the threshold voltage control circuit, and to generate a first control signal; and (iv) a power switch controllable by the first control signal to be off until an absolute value of the AC voltage is reduced to zero.

9 Claims, 4 Drawing Sheets

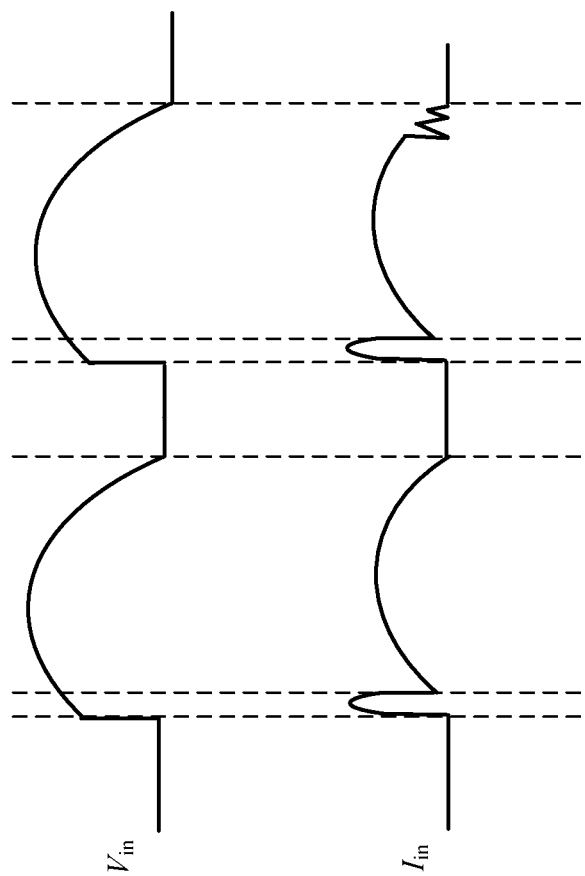
FIG. 1 (conventional)

US 9,055,635 B2

CONTROLLED-SILICON ADAPTING LED DRIVING CIRCUIT, METHOD AND SWITCH MODE POWER SUPPLY

RELATED APPLICATIONS

This application claims the benefit of Chinese Patent Application No. 201210310056.8, filed on Aug. 28, 2012, which is incorporated herein by reference in its entirety.

FIELD OF THE INVENTION

The present invention relates to the field of switch mode power supplies and, and more particularly to a silicon-controlled rectifier (SCR) configured light-emitting diode (LED) driver circuit, method, and a switch mode power supply.

BACKGROUND

For its high efficiency, energy-savings, and other advantages, light-emitting diode (LED) lighting is a prominent technology in the field of lighting. In replacing the traditional incandescent lighting which LED lighting, silicon-controlled rectifier (SCR) circuits may be used to achieve precise dimming of an LED load. In conventional approaches, an LED driving circuit with an SCR typically controls a switching operation of a power switch in a power stage circuit, and provides a constant output current for the LED load. Commonly, the LED driving circuit has power factor correction (PFC) function to maintain an input current phase that is consistent with an input voltage of the power stage circuit.

FIG. 1 shows waveforms of example input voltage current of the LED driving circuit with an SCR in conventional approaches. The SCR can be turned off when the input current of the power stage circuit is less than a holding current of the SCR. However, because the input voltage is not zero at this time, the SCR trigger circuit may charge the SCR to conduct. Then, oscillation may be generated on the input current as shown in FIG. 1. This can cause the SCR to re-conduct irregularly for many times, such that the LED driving circuit may absorb different power from the input side in each period. As a result, the LED light load may experience different brightness in different periods, as well as LED flicker and noise.

SUMMARY

In one embodiment, a light-emitting diode (LED) driver can include: (i) a silicon-controlled rectifier (SCR) and a rectifier bridge configured to receive an AC voltage, and to generate a phase-loss half sine wave voltage signal; (ii) a threshold voltage control circuit configured to receive a threshold voltage and an input voltage signal that represents the phase-loss half sine wave voltage signal, and to determine whether to output the threshold voltage based on angle information of the input voltage signal; (iii) a first control circuit configured to compare the input voltage signal against the threshold voltage output by the threshold voltage control circuit, and to generate a first control signal; and (iv) a power switch controllable by the first control signal to be off until an absolute value of the AC voltage is reduced to zero.

In one embodiment, a method of driving an LED can include: (i) receiving an AC voltage in an SCR, and converting the AC voltage to a phase-loss half sine wave voltage signal; (ii) sampling the phase-loss half sine wave voltage signal to generate an input voltage signal; (iii) detecting angle information of the input voltage signal, and generating a square wave signal; (iv) receiving a threshold voltage when the square wave signal is active; (v) comparing the input voltage signal against the threshold voltage, and generating a first comparison pulse signal; and (vi) extending an active width of the first comparison pulse signal for a period of time to obtain a first control signal for controlling a power switch, wherein the period of time lasts from a turn-off time of the power switch to a time when an absolute value of the AC voltage is reduced to zero.

Embodiments of the present invention can advantageously provide several advantages over conventional approaches. For example, the power switch control of particular embodiments can reduce LED load flickering and noise generation. Other advantages of the present invention may become readily apparent from the detailed description of preferred embodiments below.

BRIEF DESCRIPTION OF THE DRAWINGS

FIG. 1 is a waveform diagram showing an input voltage and an input current in a conventional LED driving circuit with an SCR.

DETAILED DESCRIPTION

Figure 2A:
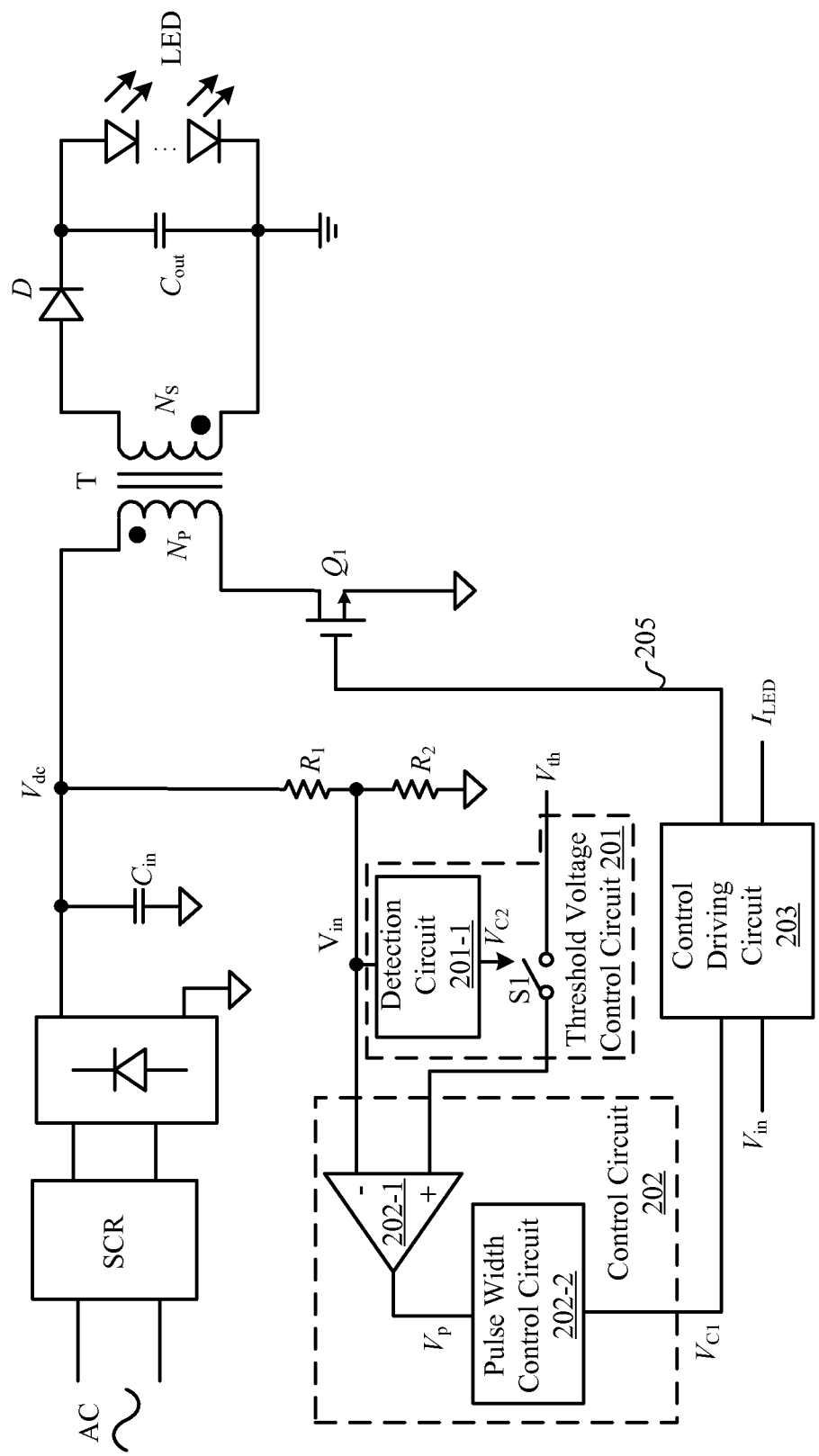
FIG. 2A is a schematic diagram of an example LED driving circuit configured for an SCR, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A light-emitting diode (LED) driving circuit or driver, and an associated driving method, in particular embodiments, can control a power switch to turn off according to the input current of a power stage circuit. The power switch can be turned off prior to a time when the input current of the power stage circuit is reduced to the holding current of a silicon-controlled rectifier (SCR), and the power switch can remain in the off state for a period of time. This period of time of the off state can ensure that the LED load current can be maintained to be greater than the holding current of the SCR during the conduction time interval of the SCR. In this way, the SCR can be prevented from being inadvertently turn off and on repeatedly. In addition, the input power of the system can be consistent in each half period, and the LED lamp or load may be prevented from flickering and generating noise.

In a normal "off" state of an SCR, the device restricts current to the leakage current. When the gate-to-cathode voltage exceeds a certain threshold, the device turns "on" and conducts current it its conducting or conductive state. The device will remain in the "on" state even after gate current is removed so long as current through the device remains above the holding current. Once current falls below the holding current for an appropriate period of time, the device will switch "off." For example, SCRs can be used in dimming control for an LED driver, or other switching applications.

In one embodiment, an LED driver can include: (i) an SCR and a rectifier bridge configured to receive an AC voltage, and to generate a phase-loss half sine wave voltage signal; (ii) a threshold voltage control circuit configured to receive a threshold voltage and an input voltage signal that represents the phase-loss half sine wave voltage signal, and to determine whether to output the threshold voltage based on angle information of the input voltage signal; (iii) a first control circuit configured to compare the input voltage signal against the threshold voltage output by the threshold voltage control circuit, and to generate a first control signal; and (iv) a power switch controllable by the first control signal to be off until an absolute value of the AC voltage is reduced to zero.

Referring now to FIG. 2A, shown is a schematic diagram of an example LED driving circuit configured for an SCR, in accordance with embodiments of the present invention. The LED driver used in a switch mode power supply can control switching operations of power switch $Q_1$, and may convert an AC voltage to a DC output signal for an LED load. In this particular example, the switch mode power supply is a single stage flyback converter. A power stage circuit of the flyback converter can include a rectifier bridge, input capacitor $C_{in}$, transformer T having primary side winding $N_P$ and second side winding $N_S$, rectifier diode D, output capacitor $C_{out}$, and power switch $Q_1$. The LED driving circuit in this example can include threshold voltage control circuit 201 and control circuit 202. The switch mode power supply can also include control driving circuit 203.

The AC voltage can be converted to a phase-loss half sine wave voltage signal $V_{dc}$ through an SCR and the rectifier bridge. Input voltage signal $V_{in}$ that represents the phase-loss half sine wave voltage signal $V_{dc}$ can be obtained by sampling phase-loss half sine wave voltage signal $V_{dc}$ through a voltage dividing resistance network which includes resistor R1 and resistor R2. Other types of DC or other half or partial wave signals can also be generated at $V_{dc}$ and/or $V_{in}$ in particular embodiments.

Threshold voltage control circuit 201 can receive input voltage signal $V_{in}$, and threshold voltage $V_{th}$, and may determine if threshold voltage $V_{th}$ should be output according to information about input voltage signal $V_{in}$. Threshold voltage control circuit 201 can include detection circuit 201-1 and switch $S_1$. Detection circuit 201-1 can receive input voltage signal $V_{in}$, and detect an angle (e.g., based on a slope rate) of input voltage signal $V_{in}$, to generate square wave signal $V_{C2}$ according to the detection information. A first terminal of switch S1 can receive threshold voltage $V_{th}$, a control terminal of switch S1 can receive square wave signal $V_{C2}$, and a second terminal of switch S1 may be configured as an output terminal of threshold voltage control circuit 201.

When square wave signal $V_{C2}$ is active (e.g., a high level), switch S1 may be turned on, and threshold voltage control circuit 201 can output threshold voltage $V_{th}$. When square wave signal $V_{C2}$ is inactive (e.g., a low level), switch S1 may be turned off, and threshold voltage control circuit 201 may not output threshold voltage $V_{th}$. In this case, the output of threshold voltage control circuit 201 may be allowed to float, or may be brought to a default (e.g., a high, a low, or another predetermined level) value by other (not shown) circuitry.

It this particular example, detection circuit 201-1 can detect angle information (e.g., based on a slope rate) of input voltage signal $V_{in}$. When the angle of the input voltage is greater than 0° and less than 90°, square wave signal $V_{C2}$ can be maintained as a low inactive state. When the angle of the input voltage is greater than 90° but less than 180°, square wave signal $V_{C2}$ can be maintained in a high level active state. For example, detection circuit 201-1 can be implemented by a differential circuit for detecting a slope rate of the input voltage signal $V_{in}$. Such a slope rate can be translated into angle information about the input voltage signal $V_{in}$.

When the detected slope rate is positive, the angle representing input voltage signal $V_{in}$ is between 0° and 90°, so square wave signal $V_{C2}$ may be in a low level inactive state. When the detected slope rate is zero, the angle representing input voltage signal $V_{in}$ is 90°, so square wave signal $V_{C2}$ may be in a high level active state. When the detected slope rate is negative, the angle representing input voltage signal $V_{in}$ is between 90° and 180°, so square wave signal $V_{C2}$ can be maintained at a high level active state. Those skilled in the art will recognize that the detection circuit is not limited to the differential circuit described above, and other circuitry with the same or similar functionality can also be employed.

In this example, control circuit 202 can include comparison circuit 202-1 and pulse width control circuit 202-2. Comparison circuit 202-1 can include a comparator having a negative input terminal to receive input voltage signal $V_{in}$, a positive input terminal to receive threshold voltage $V_{th}$ of threshold voltage control circuit 201, and an output terminal configured to generate a comparison pulse signal $V_P$. Pulse width control circuit 202-2 can receive comparison pulse signal $V_P$, and may generate control signal $V_{C1}$ by effectively extending comparison pulse signal $V_P$ for a period of time. For example, a falling edge of comparison pulse signal $V_P$ can be delayed in order to set the timing for a corresponding falling edge of control signal $V_{C1}$. Control signal $V_{C1}$ can be provided to control driving circuit 203.

Control driving circuit 203 can receive control signal $V_{C1}$, and generate a driving signal 205 to turn off power switch $Q_1$. Driving signal 205 can be controlled such that power switch $Q_1$ can be turned off when the input current is reduced to the holding current of the SCR. In addition, control driving circuit 203 can also receive input voltage signal $V_{in}$, and LED load current $I_{LED}$, to generate driving signal 205 to control the switching operation of power switch $Q_1$. In this way, dimming and a substantially constant current control for the LED load can be realized.

Figure 2B:
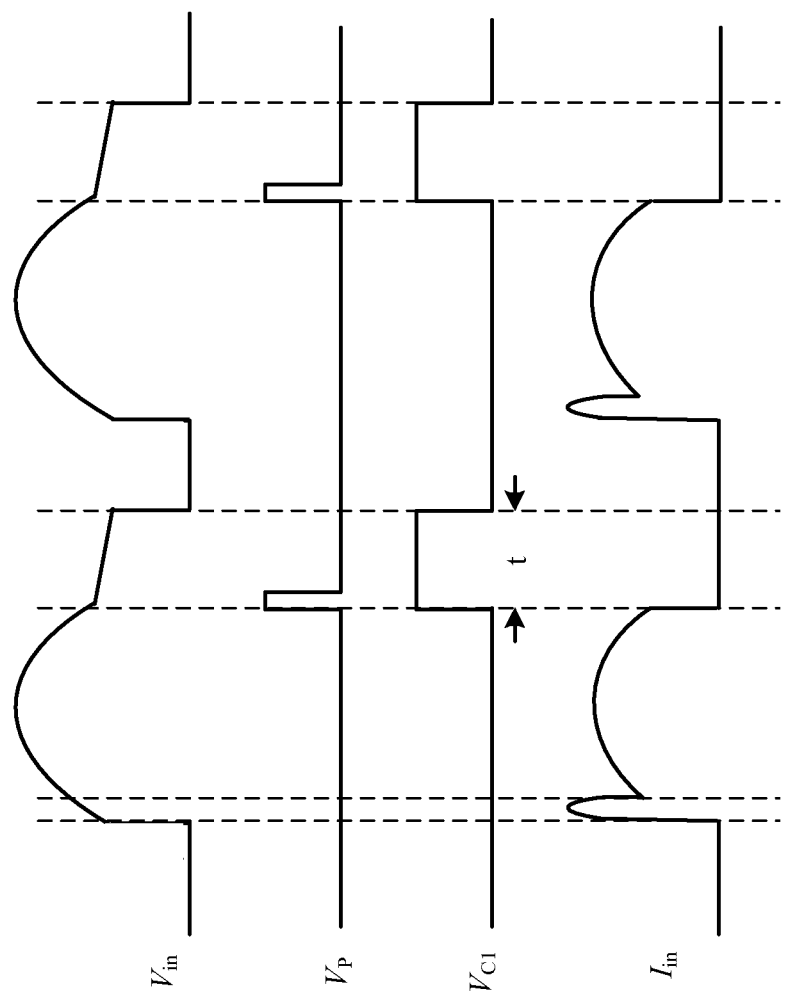
FIG. 2B is a waveform diagram of the LED driving circuit of FIG. 2A.

The following describes example operation of the example LED driving circuit of FIG. 2A in conjunction with a waveform diagram shown in FIG. 2B. in FIG. 2B, when the SCR conducting at a certain angle, the power stage circuit can receive phase-loss half sine wave voltage signal $V_{dc}$. The dividing resistance network can sample phase-loss half sine wave voltage signal $V_{dc}$ to obtain input voltage signal $V_{in}$, that represents phase-loss half sine wave voltage signal $V_{dc}$. Detection circuit 201-1 can detect the angle information of input voltage signal $V_{in}$. When the angle of input voltage signal $V_{in}$ is greater than 90° but less than 180°, square wave signal $V_{C2}$ can control switch $S_1$ to turn on, such that threshold voltage control circuit 201 can output threshold voltage $V_{th}$.

Comparison circuit 202-1 can compare input voltage signal $V_{in}$ against threshold voltage $V_{th}$. When input voltage signal $V_{in}$ is reduced to threshold voltage $V_{th}$, comparison circuit 202-1 can output comparison pulse signal $V_P$. For example, threshold voltage $V_{th}$ can be set as follows. When the input current of the power stage circuit of the switch mode power supply is reduced to the holding current of the SCR, the corresponding input voltage signal $V_{in}$ may be defined as a critical voltage. Threshold voltage $V_{th}$ can be set at a value between the critical voltage and a maximum value of input voltage signal $V_{in}$.

In this particular example, threshold voltage $V_{th}$ can be set to an optimum value between the critical voltage and the maximum value according to the LED load conditions. For example, when the LED load is a relatively small power load (e.g., about 3 W), and the maximum value of the input voltage is about 310V, threshold voltage $V_{th}$ can be set at a relatively high value (e.g., about 140V) to ensure that the input current of the power stage circuit is above the holding current of the SCR. When LED load is a relative high power load, threshold voltage $V_{th}$ can be set at a relative low value to satisfy requirements of both the output power and the normal operating current of the SCR.

Pulse width control circuit 202-2 can receive comparison pulse signal $V_P$, and may obtain control signal $V_{C1}$ by effectively extending the active width of comparison pulse signal $V_P$ for a period of time t, to control power switch $Q_1$ to turn off. As shown in FIG. 2B, at the rising edge of comparison pulse signal $V_P$, control signal $V_{C1}$ can go high and stay high for a period of time t. Time t can last from the turn off time of power switch $Q_1$ controlled by control signal $V_{C1}$ (e.g., when control signal $V_{C1}$ goes high) to the time when an absolute value of the AC voltage is reduced to zero. After power switch $Q_1$ is turned off, input current $I_{in}$ may drop to zero rapidly, and the SCR may be turned off and may remain in the off state until the next cycle.

Control driving circuit 203 can be any suitable circuit structure (see, e.g., the control driving circuit of Chinese Patent Applications CN201110069796.2 and CN200910100298.2). Also, the power stage circuit is not limited to the single stage flyback converter shown in this particular example, but can also be boost topology, buck topology, buck-boost topology, and so on. In FIG. 2B, when power switch $Q_1$ is turned on, an impulse current may be superimposed on the input current of the power stage circuit due to the existence of input capacitor $C_{in}$. In applications requiring for relatively high accuracy, the impulse current can be eliminated by an impulse current eliminating circuit (see, e.g., Chinese Patent Application CN201210200342.9).

By utilising the LED driver as shown in FIG. 2A, power switch $Q_1$ can be turned off prior to the input current being reduced to the holding current of the SCR, and may remain in the off state until the next cycle. In this way, input current $I_{in}$ can be maintained as larger than the holding current of the SCR during the conduction time of the SCR. Also, the SCR can be maintained in a normal operating state, thus avoiding repeated inadvertent on/off of the SCR as the input current is less than the holding current. The input power of the control system in each half period may also be substantially the same to prevent the LED load from flickering, and to reduce or eliminate noise.

In one embodiment, a method of driving an LED can include: (i) receiving an AC voltage in an SCR, and converting the AC voltage to a phase-loss half sine wave voltage signal; (ii) sampling the phase-loss half sine wave voltage signal to generate an input voltage signal; (iii) detecting angle information of the input voltage signal, and generating a square wave signal; (iv) receiving a threshold voltage when the square wave signal is active; (v) comparing the input voltage signal against the threshold voltage, and generating a first comparison pulse signal; and (vi) extending an active width of the first comparison pulse signal for a period of time to obtain a first control signal for controlling a power switch, wherein the period of time lasts from a turn-off time of the power switch to a time when an absolute value of the AC voltage is reduced to zero.

Figure 3:
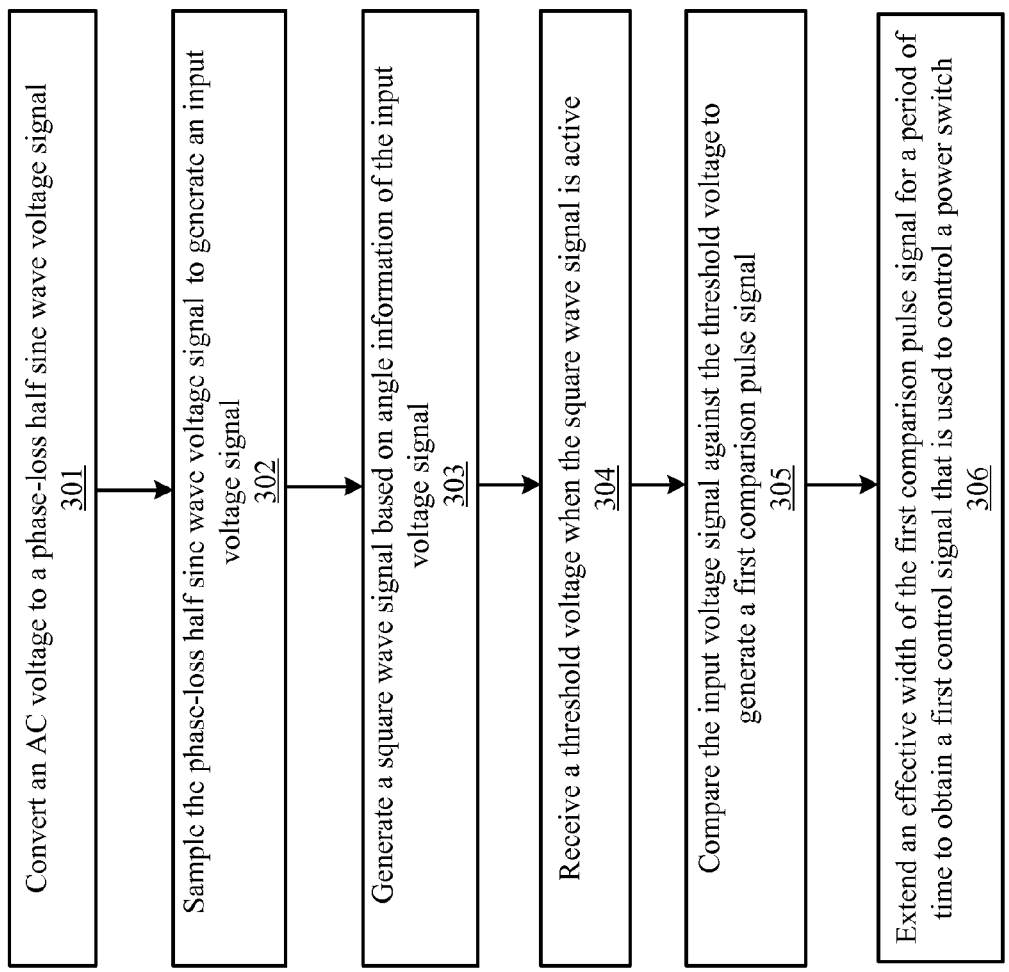
FIG. 3 is a flow diagram of an example LED driving method configured for an SCR, in accordance with embodiments of the present invention.

Referring now to FIG. 3, shown is a flow diagram of an example LED driving method configured for an SCR, in accordance with embodiments of the present invention. At 301, an AC voltage can be converted to phase-loss half sine wave voltage signal $V_{dc}$. At 302, the phase-loss half sine wave voltage signal $V_{dc}$ can be sampled to generate input voltage signal $V_{in}$. At 303, angle information (e.g., based on a slope rate) of input voltage signal $V_{in}$ can be detected and used for generating square wave signal $V_{C2}$.

At 304, threshold voltage $V_{th}$ can be received when square wave signal $V_{C2}$ is in an active state. At 305, input voltage signal $V_{in}$ can be compared against threshold voltage $V_{th}$ to generate comparison pulse signal $V_P$. At 306, the active width of comparison pulse signal $V_P$ can effectively be extended for a period of time to generate control signal $V_{C1}$. Control signal $V_{C1}$ can be used to control turn off of power switch $Q_1$, and the extended time period may last from the turn-off time of power switch $Q_1$ to the time when the absolute value of the AC voltage is reduced to zero.

Specifically, when the angle of input voltage signal $V_{in}$ is greater than or equal to 90°, and less than or equal to 180°, square wave signal $V_{C2}$ may be active high. When the angle of input voltage signal $V_{in}$ is greater than 0° but less than 90°, square wave signal $V_{C2}$ may be active low. Also, when the input current of the power stage circuit in the switch mode power supply is reduced to the holding current of the SCR, the corresponding input voltage signal $V_{in}$ may be defined as the critical voltage. Threshold voltage $V_{th}$ can be set at a certain value between the critical voltage and the maximum value of input voltage signal $V_{in}$.

In particular embodiments, an LED driving circuit configured for an SCR, and associated driving method, and switch mode power supply can obtain a comparison pulse signal by comparing an input voltage signal against a threshold voltage. A first control signal can be generated by effectively extending the active width of the comparison pulse signal for a period of time, such as by adding a delay from a falling edge of the comparison pulse signal. The control signal can control turn off of the power switch prior to a time when the input current is reduced to the holding current of the SCR. Also, the power switch can be kept in the off state for a period of time, so as to make sure that the load current (the input current of the power stage circuit) can be maintained as larger than the holding current of the SCR during the conduction time period of the SCR. This can prevent the SCR from repeatedly and irregularly re-conducting or inadvertently turning off/on, and can maintain the system input power consistently in each half period, as well as may prevent the LED from flickering and generating noise.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:
1. A light-emitting diode (LED) driver, comprising:
 a) a silicon-controlled rectifier (SCR) and a rectifier bridge configured to receive an AC voltage, and to generate a phase-loss half sine wave voltage signal to a transformer for driving an LED load;

b) a threshold voltage control circuit configured to receive a threshold voltage and an input voltage signal derived from said phase-loss half sine wave voltage signal, and to determine whether to output said threshold voltage based on angle information of said input voltage signal;

c) a first control circuit configured to compare said input voltage signal against said threshold voltage output by said threshold voltage control circuit, and to generate a first control signal; and d) a power switch coupled to said transformer controllable by said first control signal to be off until an absolute value of said AC voltage is reduced to zero.

2. The LED driver of claim 1, wherein said threshold voltage control circuit comprises:

a) a detection circuit configured to detect said angle information of said input voltage signal, and to generate a square wave signal based on said angle information;

b) a first switch having a first terminal coupled to said threshold voltage, a control terminal coupled to said square wave signal, and a second terminal configured as an output terminal of said threshold voltage control circuit; and c) wherein said first switch is turned-on, and said threshold voltage control circuit outputs said threshold voltage, when said square wave signal is active.

3. The LED driver of claim 2, wherein:

a) said square wave signal is maintained as active when an angle of said input voltage signal is equal to or greater than 90° and less than 180°; and b) said first square wave signal is maintained as inactive when said angle of said input voltage signal is greater than 0° and less than 90°.

4. The LED driver of claim 1, wherein said first control circuit comprises:

a) a comparator having a first input terminal coupled to said input voltage signal, a second input terminal coupled to said threshold voltage, and an output terminal configured to generate a first comparison pulse signal; and b) a pulse width control circuit configured to receive said first comparison pulse signal, and to generate said first control signal by extending an active width of said first comparison pulse signal for a period of time, wherein said period of time lasts from a turn-off time of said power switch until a time when said absolute value of said AC voltage is reduced to zero.

5. The LED driver of claim 1, wherein said threshold voltage is configured to be set to a predetermined value between a critical voltage and a maximum voltage, wherein said input voltage signal comprises said critical voltage when an input current of a power stage circuit in said switch mode power supply is reduced to a holding current of said SCR.

6. A method of driving a light-emitting diode (LED), the method comprising:

a) receiving an AC voltage in a silicon-controlled rectifier (SCR), and converting said AC voltage to a phase-loss half sine wave voltage signal;

b) sampling said phase-loss half sine wave voltage signal to generate an input voltage signal;

c) detecting angle information of said input voltage signal, and generating a square wave signal;

d) receiving a threshold voltage when said square wave signal is active;

e) comparing said input voltage signal against said threshold voltage, and generating a first comparison pulse signal; and f) extending an active width of said first comparison pulse signal for a period of time to obtain a first control signal for controlling a power switch, wherein said period of time lasts from a turn-off time of said power switch to a time when an absolute value of said AC voltage is reduced to zero.

7. The method of claim 6, wherein:

a) said square wave signal is maintained as active when an angle of said input voltage signal is equal to or greater than 90° and less than 180°; and b) said first square wave signal is maintained as inactive when said angle of said input voltage signal is greater than 0° and less than 90°.

8. The method of claim 6, wherein said threshold voltage is configured to be set to a predetermined value between a critical voltage and a maximum voltage, wherein said input voltage signal comprises said critical voltage when an input current of a power stage circuit in said switch mode power supply is reduced to a holding current of said SCR.

9. A switch mode power supply, comprising:

a) said LED driver of claim 1;

b) a power stage circuit having said power switch, wherein said power stage circuit is configured to drive an LED load; and c) a control driving circuit configured to receive said first control signal, and to generate an LED load current signal to drive said LED load.

* * * * *